(12) United States Patent
Edwards et al.

(10) Patent No.: US 6,389,189 B1
(45) Date of Patent: May 14, 2002

(54) FLUID-ENCAPSULATED MEMS OPTICAL SWITCH

(75) Inventors: Victoria Ann Edwards, Horseheads; Bernard Eid; Christopher Philip Brophy, both of Corning; Darol Chamberlain, Ithaca, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/520,054

(22) Filed: Mar. 7, 2000

Related U.S. Application Data

(63) Continuation-in-part of application No. 09/421,765, filed on Oct. 19, 1999
(60) Provisional application No. 60/105,323, filed on Oct. 23, 1998.

(51) Int. Cl.[7] .................................................. G02B 6/35
(52) U.S. Cl. .............................. 385/18; 385/17; 385/47
(58) Field of Search ................................ 385/16–24, 47

(56) References Cited

U.S. PATENT DOCUMENTS

| | | | |
|---|---|---|---|
| 4,580,873 A | * | 4/1986 | Levinson ..................... 385/17 |
| 4,725,127 A | | 2/1988 | Malinge et al. |
| 4,932,745 A | | 6/1990 | Blonder |
| 5,039,193 A | | 8/1991 | Snow et al. |
| 5,119,448 A | | 6/1992 | Schaefer et al. |
| 5,148,506 A | | 9/1992 | McDonald |
| 5,208,880 A | | 5/1993 | Riza et al. |
| 5,226,099 A | | 7/1993 | Mignardi et al. |
| 5,255,332 A | | 10/1993 | Welch et al. |
| 5,364,742 A | | 11/1994 | Fan et al. |
| 5,367,584 A | | 11/1994 | Ghezzo et al. |
| 5,619,177 A | | 4/1997 | Johnson et al. |
| 5,699,462 A | | 12/1997 | Fouquet et al. |
| 5,760,947 A | | 6/1998 | Kim et al. |
| 5,781,331 A | | 7/1998 | Carr et al. |
| 5,841,917 A | * | 11/1998 | Jungerman et al. ............ 385/17 |
| 5,886,811 A | | 3/1999 | Min |
| 5,903,687 A | * | 5/1999 | Young et al. .................. 385/17 |
| 5,960,132 A | * | 9/1999 | Lin ............................... 385/18 |
| 6,163,643 A | * | 12/2000 | Bergmann et al. ........... 385/140 |
| 6,195,478 B1 | * | 2/2001 | Fouquet ........................ 385/17 |

FOREIGN PATENT DOCUMENTS

| | | |
|---|---|---|
| EP | 0 902 538 A2 | 3/1998 |
| EP | 0 880 040 A2 | 11/1998 |
| JP | 55-111905 | 8/1980 |
| JP | 57-94702 | 6/1982 |
| JP | 57-192902 | 11/1982 |
| JP | 62-138820 | 6/1987 |
| JP | 1-200317 | 8/1989 |
| JP | 1-255826 | 10/1989 |

OTHER PUBLICATIONS

Bart, Stephen F., et al.; Overcoming stiction in MEMS manufacturing; MICRO, Mar. 1995; pp. 49, 50, 52, 54, 56, 58.

(List continued on next page.)

*Primary Examiner*—Rodney Bovernick
*Assistant Examiner*—Sarah U Song
(74) *Attorney, Agent, or Firm*—Joanne N. Pappas

(57) ABSTRACT

A fluid encapsulated MEMS optical switch includes an optical waveguide matrix with MEMS mirrors situated in trenches located at waveguide cross-points. The trenches are filled with collimation-maintaining fluid and the mirrors are immersed the rein. The collimation maintaining fluid prevents the light beam from spreading when it enters the switch cross-points. This feature enables the use of much smaller MEMS mirrors and prevents some of the typical MEMS mirror problems found in the related art

23 Claims, 14 Drawing Sheets

OTHER PUBLICATIONS

Petersen, Kurt E.; Dynamic Micromechanics on Silicon: Techniques and Devices; IEEE Transactions on Electron Devices, vol. ED–25, No. 10, Oct. 1978; pp. 1241–1250.

Marxer, Cornel, et al; Vertical Mirrors Fabricated by Deep Reactive Ion Etching for Fiber–Optic Switching Applications; Journal of Microelectromechanical Systems, vol. 6, No. 3, Sep. 1997; pp. 277–285.

Dautartas, Mino F., et al.; A Silicon–Based Moving–Mirror Optical Switch; Journal of Lightwave Technology, vol. 10, No. 8, Aug. 1992; pp. 1078–1085.

McCormick, F.B., et al.; Optical circuitry for free–space interconnections; Applied Optics, vol. 29, No. 14, May 10, 1990; pp. 2013–2018.

Pister, K.S.J., et al.; Microfabricated hinges; Sensors and Actuators, A. 33, 1992; pp. 249–256.

Toshiyoshi, Hiroshi, et al.; Electrostatic Micro Torsion Mirrors for an Optical Switch Matirx; Journal of Microelectromechanical Systems, vol. 5, No. 4, Dec. 1996; pp. 231–237.

Wu, Ming C., et al.; Optical MEMS: Huge Possibilities for Lilliputian–Sized Devices; Optics and Photonics News, Jun. 1998; pp. 25–29.

Lee, Shi–Sheng, et al.; Free–Space Fiber–Optic Switches Based on MEMS Vertical Torsion Mirrors; Journal of Lightwave Technology, vol. 17, No. 1, Jan. 1999; pp. 7–13.

Juan, W.H. et al.; High–Aspect Ratio Si Vertical Micromirror Arrays for Optical Switching; Journal of Microelectromechanical Systems, vol. 7, No. 2, Jun. 1998.

Lee, Shi–Sheng et al.; Surface–Micromachined Free–Space Fiber Optic Switches With Integrated Microactuators for Optical Fiber Communication Systems; IEEE, 1A4.07P, Jun. 1997.

* cited by examiner

FLUID-ENCAPSULATED MEMS OPTICAL SWITCH

CROSS-REFERENCE TO RELATED APPLICATIONS

This is a continuation-in-part, and claims the priority benefit, of U.S. patent application Ser. No. 09/421,765 filed on Oct. 19, 1999, and U.S. Provisional Patent Application Ser. No. 60/105,323, filed Oct. 23, 1998 the contents of which are relied upon and incorporated herein by reference in their entirety.

FIELD OF THE INVENTION

This invention relates generally to optical switches. In particular, the invention relates to an optical switching array that uses a movable MEMS mirror immersed in an index-matching collimation-maintaining fluid for both an open position and closed position of the switch.

BACKGROUND OF THE INVENTION

The approaches suggested for optical switches can be broadly classified into two categories: the guided wave approach, and the free-space approach. The guided-wave approach includes multiclad waveguides with bending modulation and specialty-material-based switching, whereas the free-space approach generally relies on movable optical elements such as mirrors or lenses.

Mach-Zehnder Interferometer devices, Y-branch waveguides, and other devices are commonly used in the guided-wave approach. Light is diverted from one arm of the device into the other by changing the refractive index of one of the arms of the device. This is typically done using electrical, thermal, or some other actuating mechanism.

The free-space approach has an advantage over the guided-wave approach in some applications. It has very low cross talk because the waveguides are physically isolated from one another and coupling cannot occur. The only source of cross talk in this approach is due to scattering off the movable optical element. In addition, free-space devices are wavelength-independent and often temperature-independent.

There have been several free-space approaches that have been proposed. One such approach uses a switch array with movable micro-electro-mechanical system (MEMS) mirrors. The input and output optical fibers are set in grooves and are disposed orthogonal to each other. The MEMS mirrors are positioned at the intersection of the input fibers and the output fibers, in free space. This method requires fairly large mirrors and collimators. This is due to the inevitable spreading of the light beam as it leaves the waveguide and travels in free-space toward the MEMS mirror. The large mirrors are problematic because of their requirements for angular placement accuracy, flatness, and the difficulty of actuating such a relatively large structure quickly and accurately. These devices typically have an actuation distance of 300 μm to 400 μm, which negatively impacts switching speed. In addition, the individual collimators must be assembled for each input and output fiber, thus increasing fabrication costs.

In a second free-space approach, a planar waveguide array is used. Trenches are formed at the cross-points of the input waveguides and the output waveguides. Digital micromirror devices (DMD) are positioned within the trenches, in free-space. Each micromirror acts like a shutter and is rotated into the closed position by an electrostatic or a magnetic actuator so that the light signal is reflected from an input waveguide into an output waveguide. When the shutter is in the open position, the light continues to propagate in the original direction without being switched. This method is also subject to the beam-spreading problem, and it appears that the typical losses from such a switch would be high.

A third free-space approach uses an index-matching fluid as the switching element. A planar waveguide array is formed on a substrate. Trenches are formed at the cross-point and are filled with a fluid that matches the refractive index of the waveguide core. In order to actuate the switch, the fluid is either physically moved in and out of the cross-point using an actuator, or the fluid is thermally or electrolytically converted into a gas to create a bubble. For this approach to work, the facets cut at the end of the waveguide at the cross-points must be of mirror quality, since they are used to reflect the light into the desired waveguide. Finally, the fluid must be withdrawn cleanly to preserve the desired facet geometry and to prevent scattering losses due to any remaining droplets.

In yet another approach, a beam is disposed diagonally over a gap in a waveguide. A mirror is suspended from the beam into the gap. An electrode is disposed adjacent to the gap and underneath the beam. When the electrode is addressed, the beam and mirror move into the gap to reflect light propagating in the waveguide. This approach has several disadvantages. This method is also subject to the beam-spreading problem discussed above. Again, it appears that the typical losses from such a switch would be high. Second, the electrodes are disposed on the substrate that the waveguides are disposed in. This design is costly to reproduce.

Thus, a need exists for an optical switch having the advantages of the free-space approach, without the disadvantages of the related designs discussed above.

SUMMARY OF THE INVENTION

The present invention addresses the needs discussed above. A movable MEMS minor is disposed in a trench that is filled with a non-conducting, low-viscosity, index-matching fluid. The index-matching fluid functions as a collimation-maintaining fluid that prevents the light beam from spreading in switch cross-points. Thus, smaller mirrors are used at switch cross-points resulting in smaller actuation distances, and shorter actuation times.

One aspect of the present invention is an optical device for directing a light signal, the optical device includes a first light propagation path, and a second light propagation path intersecting the first light propagation path to form a cross-point. A micromirror is movable between a through-state outside of the cross-point and a reflecting-state in the cross-point. A baffle-member is positioned adjacent the micromirror to inhibit spurious reflections in the through-state.

In another aspect, the present invention includes an optical device for directing a light signal. The optical device includes a first waveguide and a second waveguide intersecting the first waveguide to form a cross-point. A trench intersects the cross-point. A micromirror is disposed in the trench and movable between a through-state outside of the cross-point and a reflecting-state at the cross-point. A blocking material is disposed on a portion of a sidewall of the trench to inhibit spurious reflections in the through-state.

Additional features and advantages of the invention will be set forth in the detailed description which follows, and in part will be readily apparent to those skilled in the art from

DETAILED DESCRIPTION OF THE PREFERRED EMBODIMENTS

Figure 1:
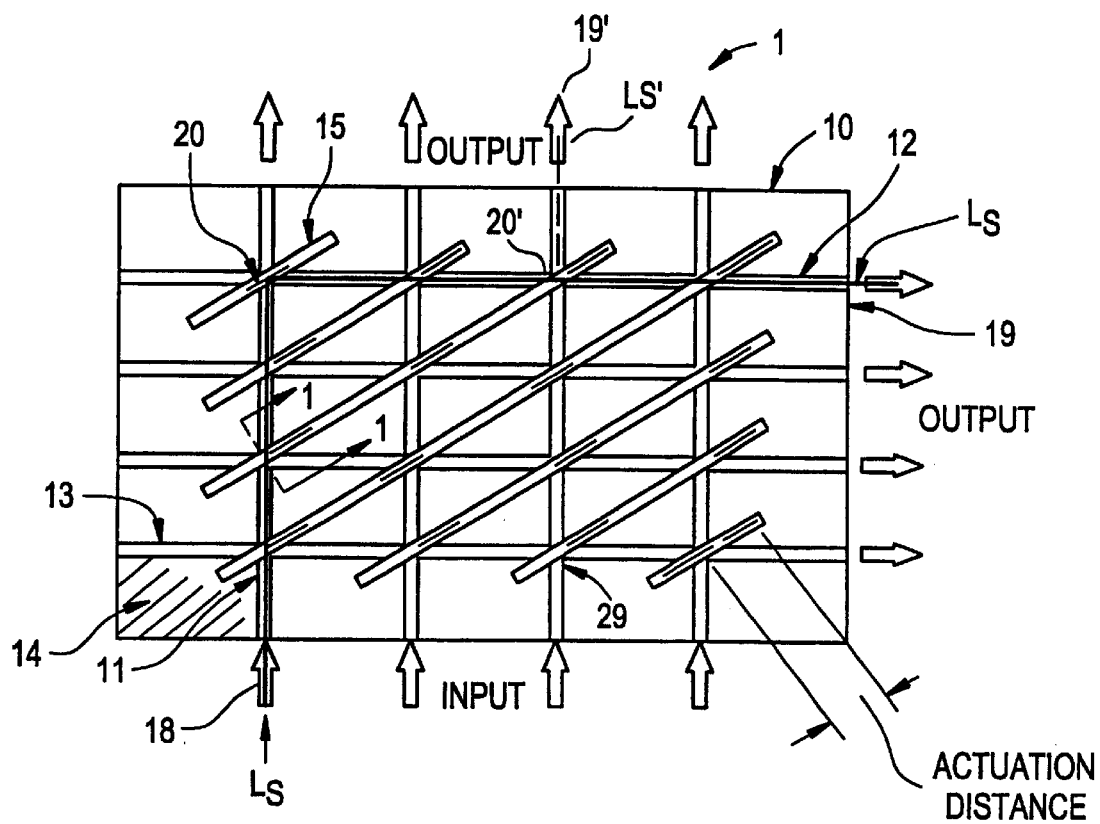
FIG. 1 is plan view of a first embodiment of the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the optical switch of the present invention is shown in FIG. 1, and is designated generally throughout by reference numeral 1.

In accordance with the invention, the present invention for an optical switch includes a movable MEMS mirror 22 disposed in a trench 15 that is filled with a non-conducting, low-viscosity, index-matching fluid 30. The index-matching fluid 30 functions as a collimation-maintaining fluid that prevents the light beam from spreading in switch cross-points 29. Because the light signal remains collimated in the switch cross-points, smaller mirrors are used, resulting in smaller actuation distances, and hence, shorter actuation times. The preferred embodiment of the present invention is hereinafter described in greater detail with reference to the accompanying drawings.

FIG. 1 is a plan view of an optical switch 1 of the first embodiment of the present invention. The switch 1 is a waveguide matrix formed from a waveguide core material 13 and clad material 14, which are deposited on first substrate 10. The core 13 and the cladding 14 are arranged on first substrate 10, to form a plurality of input waveguides 11 and a plurality of output waveguides 12. A plurality of trenches 15 are formed at cross-points 29 wherein input waveguides 11 intersect output waveguides 12. One of ordinary skill in the art will recognize that there are several ways to form the trenches 15. First, the trenches 15 can be formed as shown in FIG. 1, as continuous diagonal channels that intersect a plurality of cross-points. Alternatively, the trenches 15 can be disposed as discrete wells, formed separately and intersecting a single cross-point.

A plurality of independently movable switching elements 20 are disposed in trenches 15 at each cross-point 29. Each switching element 20 can be independently moved between an open position and a closed position. In the open position, light is allowed to propagate through the switch cross-points 29. In the closed position, switching element 20 is moved into the cross-point 29 to direct light into the output wiveguide 12.

The operation of switch 1 is as follows. A light signal $L_s$ enters switch 1 by way of input port 18. The light signal $L_s$ propagates within input waveguide 11 until it is deflected into the output waveguide 12 by the switching element 20, which is in the closed position. Light signal $L_s$ exits switch 1 from output port 19. Note also that two-sided switches can be used route light along multiple paths. Switch 20', is shown directing light signal $L_s'$ to output port 19'. Thus, the present invention can be configured as an N×M non-blocking cross-bar switch.

Figure 2:
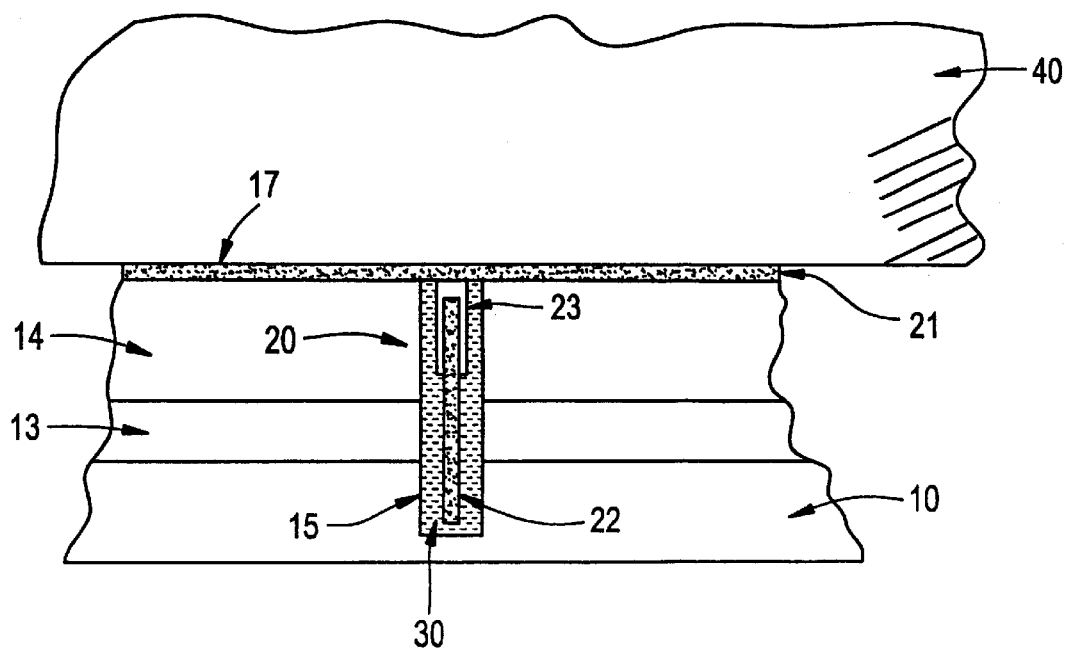
FIG. 2 is a sectional view of the first embodiment taken along lines 1—1 of FIG. 1, showing the relationship between the elements formed on the first substrate and the elements formed on the second substrate.

FIG. 2 is a sectional view of the optical switch 1 taken along lines 1—1 as depicted in FIG. 1. In the first embodiment, switching elements 20 are formed on a second substrate 40. The second substrate 40 is then aligned with the first substrate 10 such that the switching elements 20 are disposed in the plurality of trenches 15. The first substrate 10 is connected to the second substrate 40 by flip-chip bonding or similar methods at connection interface 17. In a third embodiment, which will be discussed subsequently, switching elements 20 can be formed on the first substrate 10. In this embodiment, the second substrate 40 functions merely as a cover for the switch 1.

Switching element 20 includes a sliding MEMS mirror 22, mirror anchor 23, MEMS chip 21, and an actuator 25, which is not shown in this view. The sliding mirror 22 is connected to MEMS chip 21 by mirror anchor 23, disposed in trench 15, and immersed in collimation maintenance fluid 30. The collimation maintenance fluid 30, is preferably a non-conducting, low viscosity fluid that has a refractive index that is closely or substantially matched to the refractive index of the core material 13. Electrically non-conducting fluid is required for all electrostatic actuators, but is not required for magnetic actuators. When using thermal actuators to implement the design, the fluid should not be of low thermal conductivity.

Mirror 22 is immersed in fluid 30 for both the open and closed switching positions. This yields distinct advantages over the related art. Typically, a light signal propagating in core 13 is collimated. When it enters the trench 15, the fluid 30 maintains collimation because it is matched to the refractive index of the core. Because beam spreading is mitigated by the fluid 30, a smaller mirror structure can be used. In the present invention, MEMS mirror 22 is only 15 $\mu$m wide and 2 $\mu$m thick.

The trench 15 is only 6 $\mu$m to 10 $\mu$m wide. As a result, a much shorter actuation distance, on the order of 15 $\mu$m, is achieved. This is a significant improvement over the related art that has actuation distances of 300 $\mu$m to 400 $\mu$m. This improvement also results in an optical switch 1 having a much shorter switching time of approximately 370 $\mu$sec, as compared to 10 msec for a 400 $\mu$m mirror. Note that trench 15 must be etched to a sufficient depth to allow mirror 22 to eclipse substantially all (>99%) of the modal energy of the light signal when in the reflecting position. In one embodiment, the trench is 6 $\mu$m wide, providing 2 $\mu$m clearance on either side of the 2 $\mu$m mirror 22. Those of ordinary skill in the art will appreciate that other structures, such as gratings and refracting elements, can be used to implement switching element 20.

In an alternate embodiment of the present invention, waveguides 11 and 12 have a $\Delta_{1-2} \approx 0.5\%$. One of ordinary skill in the art will recognize that $\Delta_{1-2}$ is defined as:

$$\Delta_{1-2} = \frac{n_1^2 - n_2^2}{2n_1^2},$$

wherein $n_1$ is the refractive index of the core and $n_2$ is the refractive index of the cladding. By raising $\Delta_{1-2}$ from 0.34% (matched to the fiber industry standard SMF-28) to 0.5%, a savings of 5–7 $\mu$m in actuation distance and 5 $\mu$m in trench depth is obtained.

Figure 3:
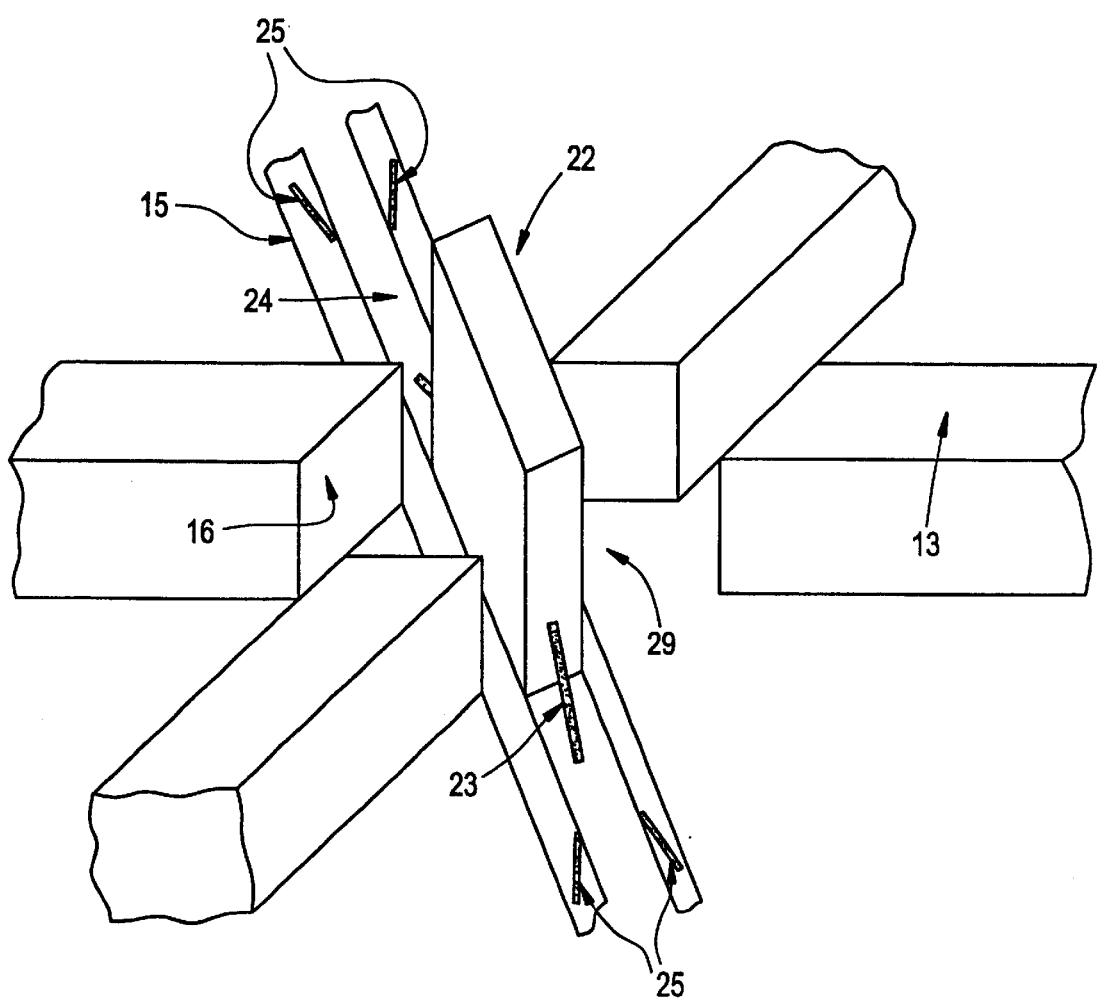
FIG. 3 is a three dimensional view of a second embodiment showing the sliding MEMS mirror assembly and the MEMS actuator.

FIG. 3 is a three dimensional view of the second embodiment. Slider 24 is disposed or the floor of trench 15. Sliding MEMS mirror 22 is connected to the slider 24 by the mirror anchor 23, shown schematically. MEMS mirror 22 is moved between an open position and a closed position by MEMS actuator 25, which moves the slider 24 in and out of the cross-point 29 depending on the desired switch position. The MEMS actuator 25 can be implemented in several ways that are widely known in the art. MEMS actuator 25 can be implemented using an electrostatic actuator, such as a scratch drive or a comb drive. A magnetic actuator can also be used in the design. A thermal actuator is a third method that can be used to implement actuator 25. Note that in FIG. 3 the collimation maintenance fluid 30 is not shown for clarity of illustration. However, the fluid 30 plays an important role in the machining requirements of waiveguide facets 16. These requirements can be relaxed for two reasons: first, because collimation-maintenance fluid 30 inhibits beam spreading; and second, because the facets 16 are not used to reflect the light signal during switching. In FIG. 3, the facets 16 form an angle of approximately 45° with the face of the sliding MEMS mirror 22. However, because of the relaxed requirements, the angle need not be 45°. The angle could in fact be any arbitrary value between 0° and 45°.

Figure 4:
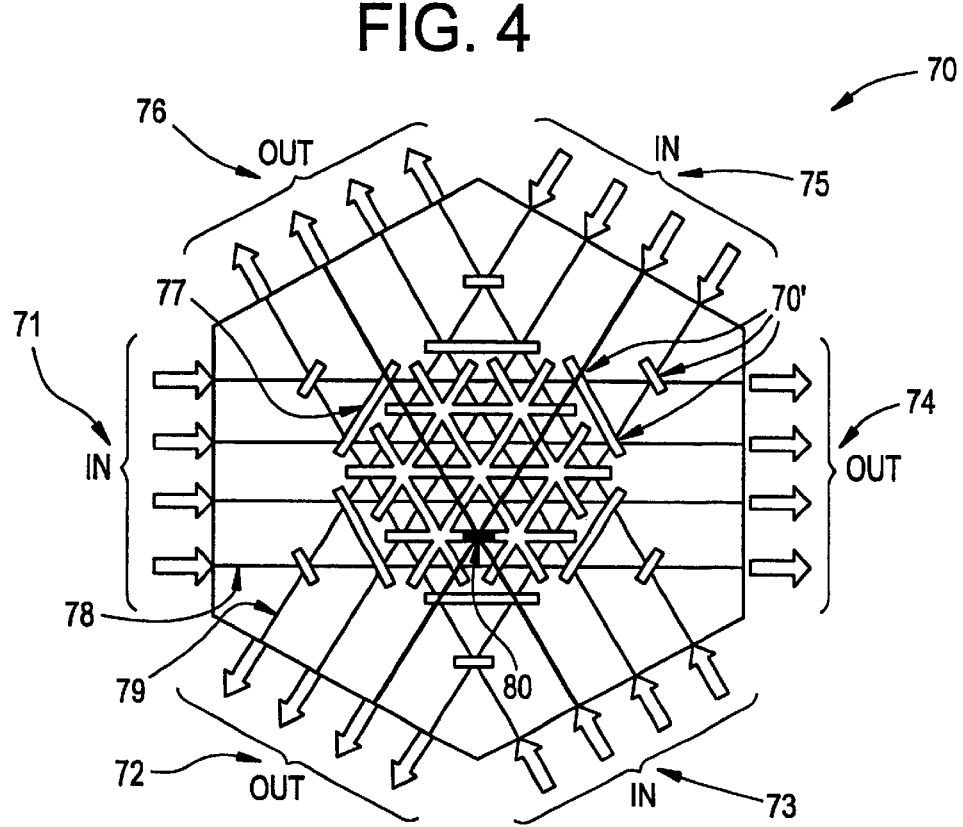
FIG. 4 is a plan view of a third embodiment of the present embodiment, showing a hexagonal version of the optical switch.

FIG. 4 is a plan view of a third embodiment of the present embodiment, depicting a hexagonal version of the optical switch 70. There are three linear arrays of input waveguides 71, 73, and 75 arranged on a first, third, and fifth side of hexagonal switch 70. There are three linear arrays of output waveguides 72, 74, and 76 arranged on a second, fourth, and sixth side of hexagonal switch 70. A two dimensional array of trenches 77 are disposed at cross-points 701 where the input optical waveguides 71, 73, and 75 intersect the output optical waveguides 72, 74, and 76. A plurality of independently movable switching elements, only one of which is shown for clarity of illustration, are disposed in trenches 77 at each cross-point 701. The switching elements of the second embodiment operate in the same manner as switching elements 20 of the first embodiment. Those skilled in the art will appreciate that other polygon array geometries could be used.

Figure 5A:
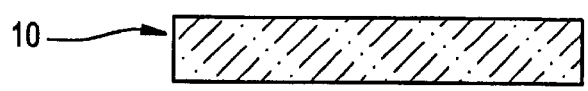
FIGS. 5A to 5H are a diagrammatic view of the first embodiment of the present invention showing the optical switch at various stages of fabrication.

FIGS. 5A to 5G are diagrammatic views of the first embodiment of the present invention showing the optical switch at various stages of fabrication. FIG. 5A shows the formation of a first substrate 10. First substrate 10 can be formed using any of the methods and materials commonly known to those of ordinary skill in the art. Such methods may include glass-forming methods, use of semiconductor materials such as silicon, chemical vapor deposition of silica, fused silica, ceramic materials, metallic materials, or polymeric materials.

Figure 5B:
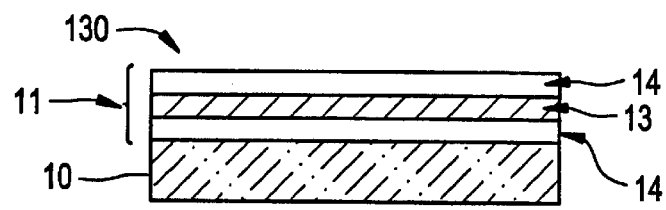

In FIG. 5B, an optical waveguide layer 11 is formed on substrate 10. A variety of methods and materials can be used to form Layer 11, including: sol-gel deposition of silica; amorphous silicon; compound semiconductor materials such as III–V or II–VI materials; doped chemical vapor deposition of silica; organic-inorganic hybrid materials; or polymer materials. Layer 11 includes waveguide core material 13 and waveguide clad material 14. The waveguide structures 130 are then formed using photolithographic techniques wherein layer 11 is selectively exposed to radiation. Excess material is removed to form the waveguide structures 130. In another method, waveguide structure material is deposited in a groove etched in the cladding material to form the waveguide structure 130. Other techniques such as embossing and micro replication can also be used to form the waveguide structures 130.

Figure 5C:
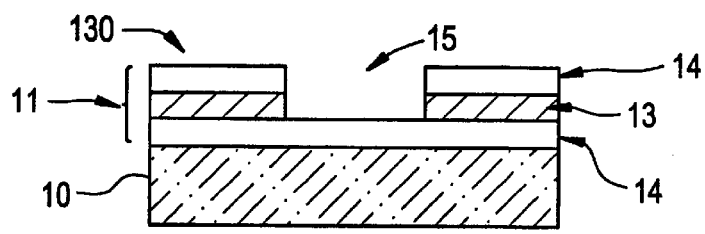

FIG. 5C shows a plurality of trenches 15 being formed in the waveguide structure 130. Photolithographic techniques are used to form trenches 15 on the waveguide structures 130. Excess material is removed by etching.

Figure 5D:
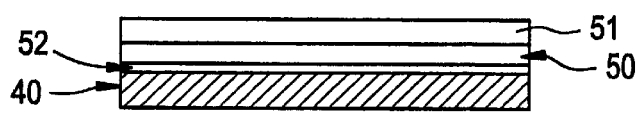
Figure 5E:
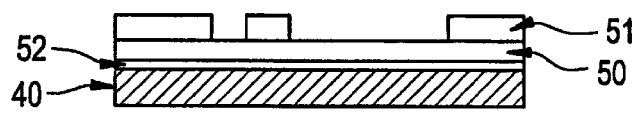
Figure 5F:
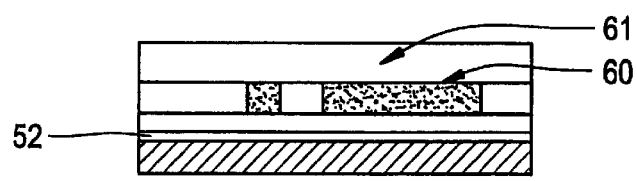
Figure 5G:
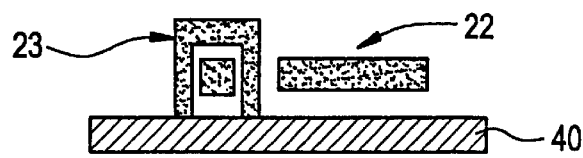

In FIGS. 5D TO 5G, a preferred method of fabricating the switching element 20 is described. In this example, the fabrication of the switch element 20 is carried out using micro-machining on a MEMS substrate. In FIG. 5D, a second substrate 40 is formed. An optional nitride layer 52, an oxide layer 50 and a polysilicon layer 51 are then deposited thereon. The image of the mirror 22 and hinge 28 are transferred onto the polysilicon layer using UV radiation. In FIG. 5E, a mold of the hinge and mirror is formed when excess photoresist material is washed away. In FIG. 5F, the mold is filled with mirror material 60 and covered with an oxide layer 61. As is shown in FIG. 5G, after several intermediate steps wherein holes are drilled and excess material is removed, MEMS mirror 22 and anchor 23 remain on second substrate 40, to form a portion of switching element 20. Mirror 22 is coated with a layer of gold to form the mirrored surface. Subsequently, mirror 22 is rotated to form a right angle with substrate 40. It is noted that the MEMS actuator 25, which is not shown, is also part of switching element 20 and is formed during this process. The actuator 25 is omitted for clarity of illustration.

Figure 5H:
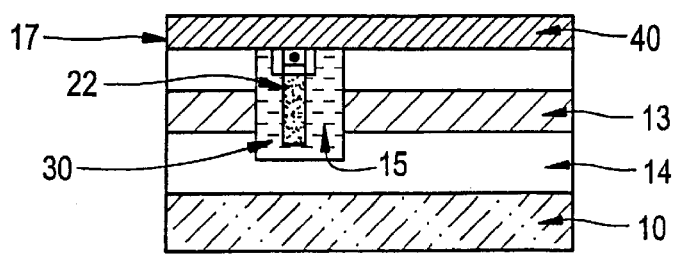

FIG. 5H depicts the final step of fabrication. Second substrate 40 is aligned with the first substrate 10 and mirror 22 is inserted into trench 15. The first substrate 10 is then connected to the second substrate 40 by bonding or some other means. The trenches are filled with fluid 30 using access holes, which are then sealed.

Figure 6:
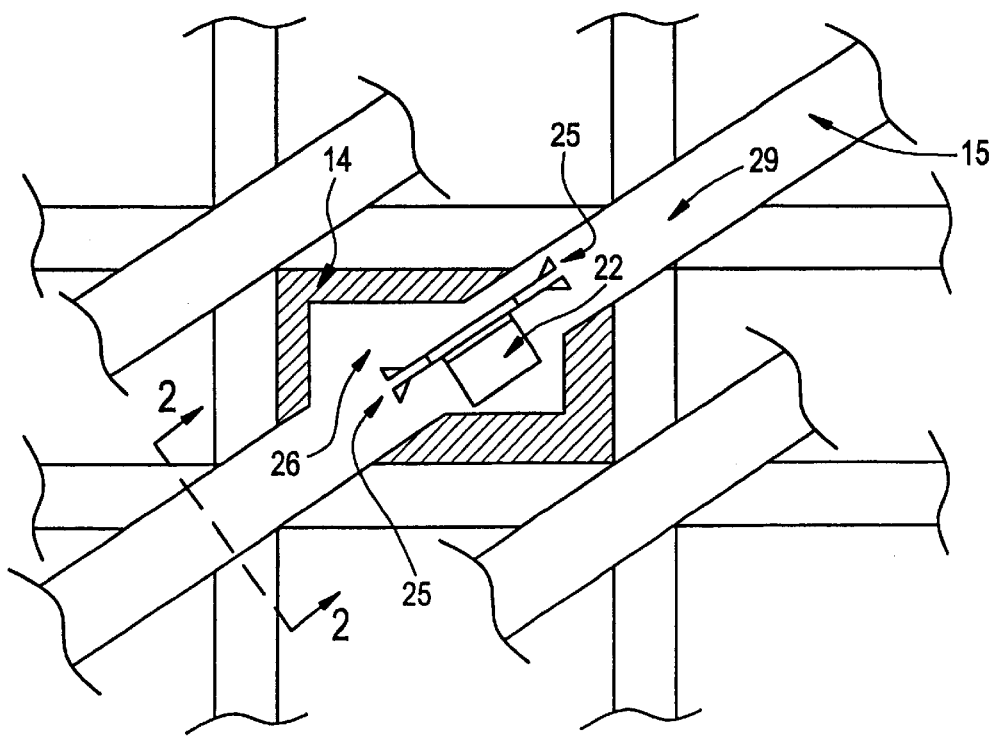
FIG. 6 is a detail view of the second embodiment of the present invention showing the MEMS assembly area.

FIG. 6 is a detail view of a second embodiment of the present invention showing the MEMS assembly area 26. The assembly area 26 is used when the switching element 20 is formed integrally with substrate 10 using the surface micro-machining fabrication technique. The assembly area 26 is formed in that portion of the trench 15 that is situated between waveguide cross-points 29. The purpose of the assembly area is to provide the necessary area for fabricating the mirror 22 and rotating it into its operational position.

Figure 7:
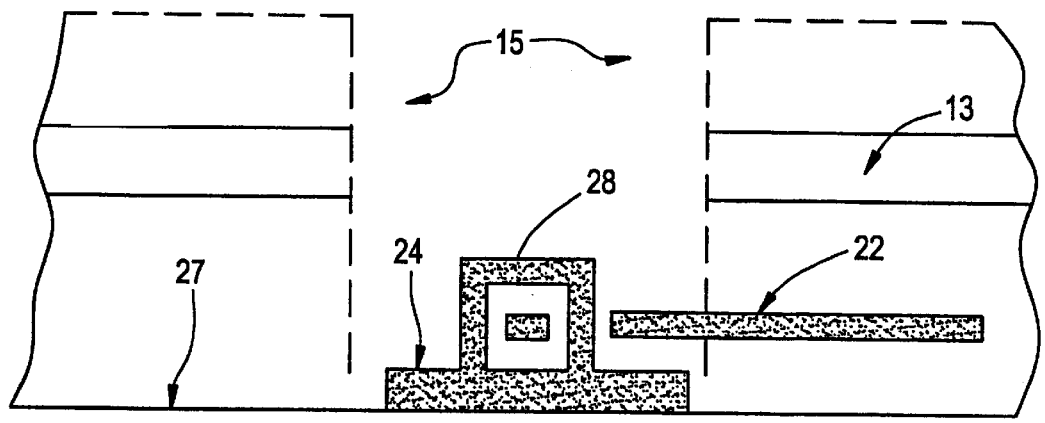
FIG. 7 is a sectional view of the second embodiment of the present invention taken along lines 2—2 of FIG. 6, showing the MEMS assembly area before the MEMS mirror is rotated into position.
Figure 8:
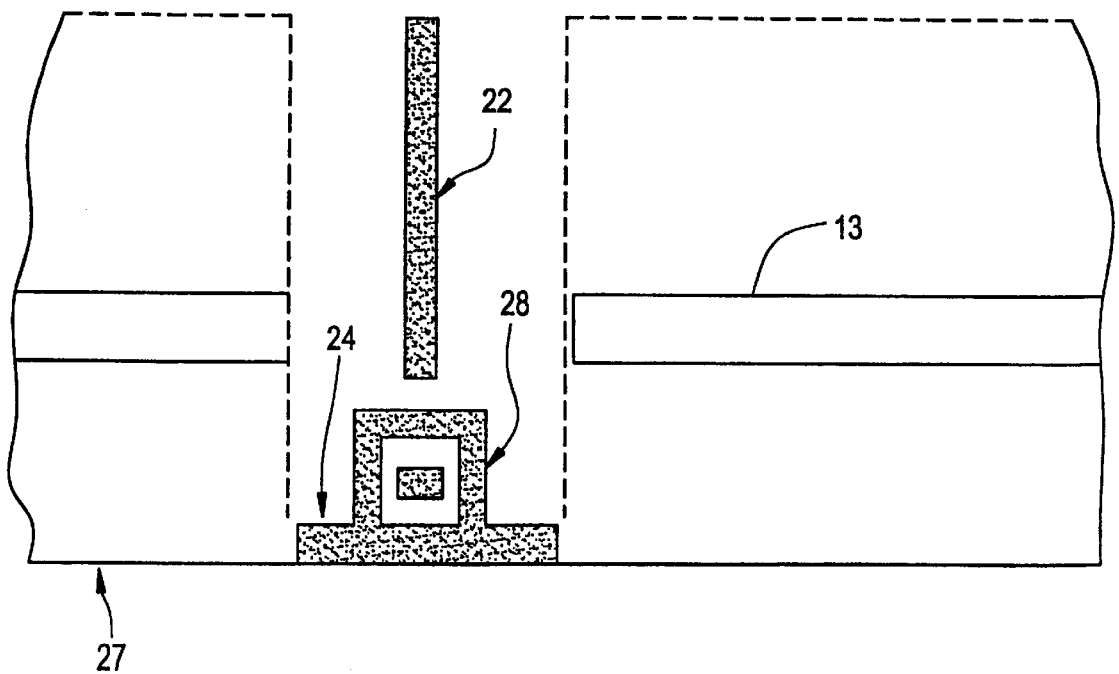
FIG. 8 is a sectional view of the second embodiment of the present invention taken along lines 2—2 of FIG. 6, showing the MEMS assembly area after the MEMS mirror is rotated into position.

FIG. 7 is a sectional view of FIG. 6, taken along lines 2—2 showing the MEMS assembly area before the MEMS mirror is rotated into position. The mirror 22 is shown parallel to the assembly area floor 27 immediately after fabrication. The last step in the fabrication of the switch is to rotate mirror 22 around the hinge 28 into a position perpendicular to assembly floor 27. FIG. 8 is also sectional view of FIG. 6, taken along lines 2—2 showing the MEMS assembly area after the MEMS mirror is rotated into position. After the mirror 22 is rotated, it is then able to slide along slider track 24 inside trench 15 toward the waveguide cross-points 29.

One of ordinary skill in the art will recognize that other methods are used to fabricate the mirrors 22 and the actuators 25. LIGA technology is well suited for this purpose. LIGA uses deep X-ray lithography to expose an X-ray sensitive resist layer. The excess resist is removed and the resulting relief is electroplated. The resulting form is a highly accurate metal structure that can be used as a master for injection molding or compression molding processes, or it can be used as the desired structure itself. Bulk micro-machining by anisotropic etching of (110) silicon is another suitable method of fabrication. This technique has advantages over the surface micro-machining process. When using the bulk micro-machining technique, the mirror 22 does not have to be rotated as depicted in the sequence shown in FIGS. 7–8. The bulk micro-machining technique allows the mirror 22 to be fabricated in a position perpendicular to the substrate 10 as shown in FIG. 8, but without the hinge. The hinge is not needed because the mirror does not have to be rotated into its operational position. This technique would allow for the gold-plating of both sides of the mirror to implement a two-way switch. Another advantage is that the silicon surface is smoother as a result of the, bulk micro-machining technique. Silicon-on-insulator technology (SOI) and Single Crystal Reactive Etching and Metallization (SCREAM) process technology can also be used to fabricate mirrors 22 and actuators 25.

Figure 9:
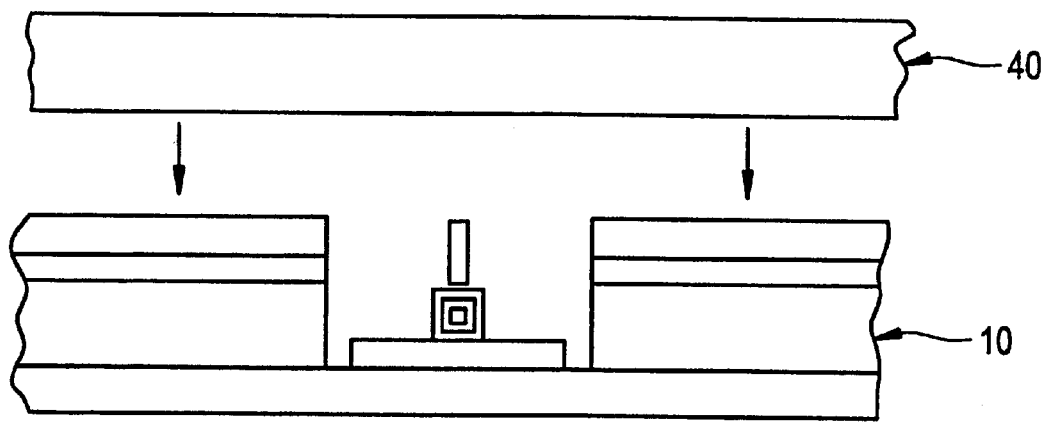
FIG. 9 is a sectional view of the second embodiment of the present invention taken along lines 2—2 of FIG. 6, showing fabrication details.

In an alternate embodiment of the present invention, as embodied herein and depicted in FIG. 9, the second substrate 40 functions only as a cover. The first substrate 10 is then connected to the second substrate 40 by bonding or some other suitable means. The trenches are then filled with fluid 30 using access holes, which are then sealed.

Figure 10:
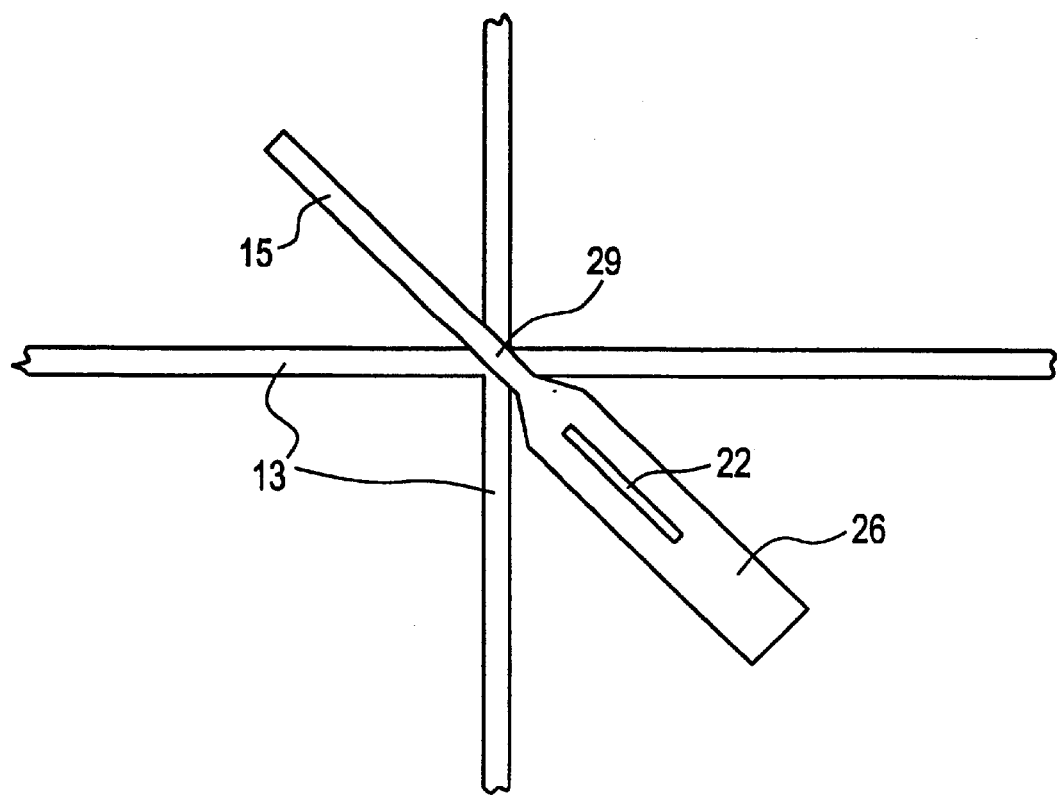
FIG. 10 is a detail view of the MEMS assembly area in accordance with an alternate embodiment of the present invention.

As embodied herein and depicted in FIG. 10, a detail view of the MEMS assembly area 26 in accordance with an alternate embodiment of the present invention is disclosed.

In FIG. 10, MEMS assembly area 26 is fabricated by flaring the side walls of trench 15 out to produce a wider gap. The flaring of the side walls is introduced away from switch cross-point 29 to minimize optical impairment. The wider gap provides more area for the initial assembly of mirror 22.

Figure 11:
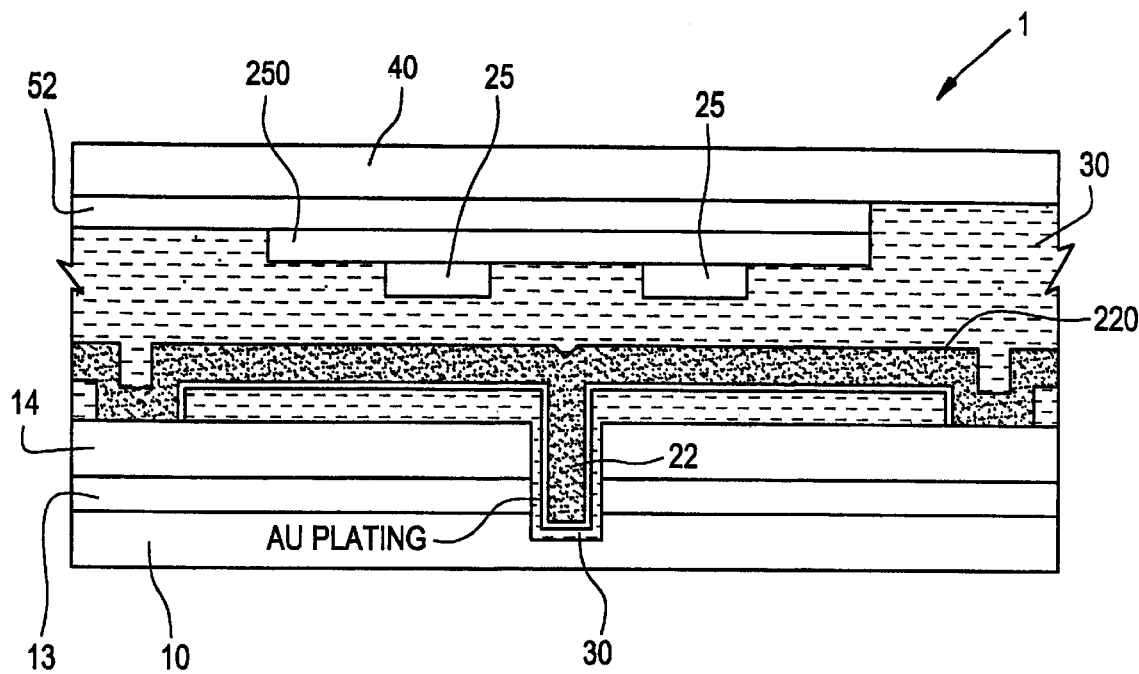
FIG. 11 is a sectional view of a fourth embodiment of the present invention.

As embodied herein and depicted in FIG. 11, a sectional view of a fourth embodiment of the present invention is disclosed. Optical switch 1 includes first substrate 10 and second substrate 40. First substrate 10 has a core portion 13 and cladding 14 deposited thereon to form waveguides 11 and 12. Trench 15 is formed at cross-point 29 where waveguide 11 and waveguide 12 intersect. Collimation-maintaining fluid 30 is disposed in trench 15. Collimation-maintaining fluid 30 has a refractive index substantially the same as the refractive index of core portion 13. Movable mirror 22 has an open position for allowing light to continue to propagate along core 13 and a closed position for directing the light signal into output port 19 (not shown). Mirror 22 is disposed in trench 15 and substantially immersed in collimation maintaining fluid 30 when in either the open position or the closed position. Mirror 22 includes patterned beam 220 that is used to anchor mirror 22 to cladding 14. Substrate 40 has electrostatic actuator 25 deposited thereon. Actuator 25 is connected to transistor 250. Transistor 250 is connected to individually an addressable electrode. Thus, a two-dimensional array of transistors 250 is integrated on substrate 40, wherein each cross-point 29 in optical switch 1 has its own addressable electrode. The integrated electronics (electrodes and transistors 250) are assembled on substrate 40 using pick and place technology or integrated directly on a silicon wafer deposited on substrate 40. Thus, first substrate 10 is an optical substrate that includes an N×M array of waveguides and second substrate 40 is an electrical substrate that includes the actuation and addressing scheme for the N×M array. One of ordinary skill in the art will recognize that the N×M array forms a non-blocking cross-bar switch.

Switch 1 in FIG. 11 operates as follows. When the addressable electrode is de-energized, transistor 250 provides no power to actuator 25 and mirror 22 is in the closed position. Hence, light is reflected by mirror 22 into output port 19 (not shown). When power is applied to the addressable electrode transistor 250 is energized and an electrostatic force is present on actuator 25. Plate 220 is flexed upward by the electrostatic force and mirror 22 is lifted out of trench 15 into an open switch position. Light passes through cross-point 29 and continues to propagate along core 13.

Figure 12:
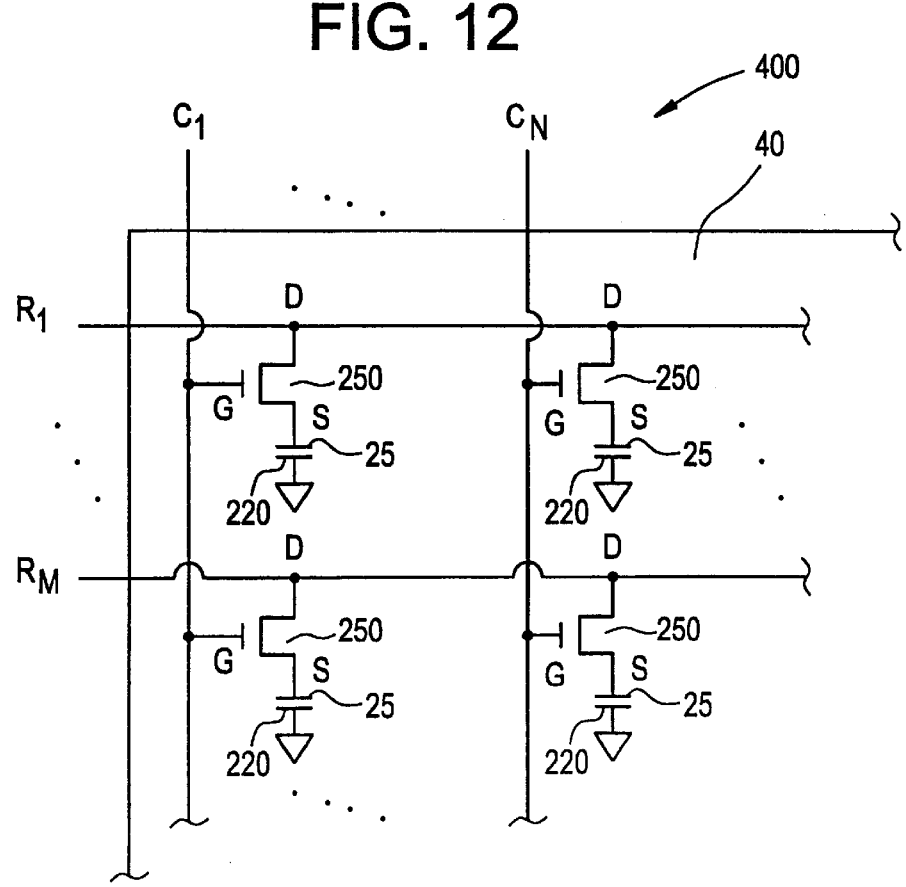
FIG. 12 is a schematic view of the integrated addressing electronics for the fourth embodiment of the present invention.

As embodied herein and depicted in FIG. 12, a schematic view of the integrated addressing electronics 400 for the fourth embodiment of the present invention is disclosed. In an N×M switch, wherein N=M=16 or greater, it is impractical to individually address each transistor 250 with its own electrode. Each gate and drain would need its own electrode. This results in 2×N×M electrodes. In FIG. 12, electrical substrate 40 includes column addressing lines C1 ... $C_N$ and row addressing lines R1 ... $R_M$. Each column address line Ci is connected to the gate of each transistor 250 in the column Ci. Each row address line Rj is connected to the drain of each transistor in the row Rj. The source of each transistor 250 is connected to the individual electrostatic actuators 25. One of ordinary skill in the art will recognize that actuator 25 and beam 220, as shown in FIGS. 11 and 12, form the upper and lower plates of a capacitor. One of ordinary skill in the art will also recognize that integrated addressing electronics 400 can also be used with magnetic actuators.

Addressing electronics 400 operate as follows. The controller activates one column at a time. After a column C1 is activated with a high voltage, the controller places a control word on the row address lines R1 . . . $R_M$. For example, for system having R1–R4, a control word 1010 would result in R1 and R3 being supplied with a high voltage, and R2 and R4 being grounded. Subsequently, C1 is de-activated and C2 is activated. Again the controller places a control word on the row address lines R1 . . . $R_M$. In like manner, each actuator 25 is actuated one column at a time until switch 1 is in the desired state. One of ordinary skill in the art will recognize that for a non-blocking switch, only one actuator is turned on in any one row or column at a time.

Figure 13:
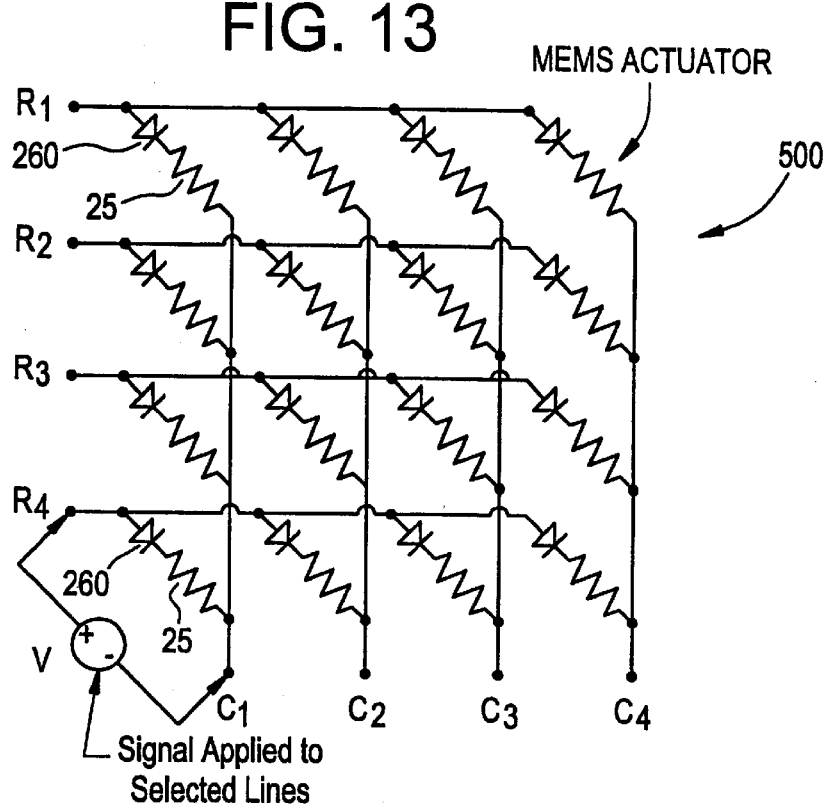
FIG. 13 is a schematic of the addressing electronics for a fifth embodiment using thermal actuators.

As embodied herein and depicted in FIG. 13, a schematic of the addressing electronics 500 for a switch using thermal actuators is disclosed. Thermal actuators are well known in the art As current flows, the device heats and expands causing the mirror 22 to move along the sliding track 24 (as shown in FIG. 3). In this embodiment, electronics 500 are disposed on the optical substrate 10. Diode 260 is added in series with actuator 25. Diode 260 limits the flow of current to one direction through all of the actuators. Use of diodes 260 eliminates all current paths opposite to the intended row-to-column or column-to-row direction. In this embodiment, note that column C1 is activated by being pulled low, in this case, by V−. Row R4 is addressed using a high voltage V+. Thus, a current flows through diode 260. If C1 were pulled high and R4 were pulled low, diode 260 prevents current from flowing in the reverse direction.

Figure 14:
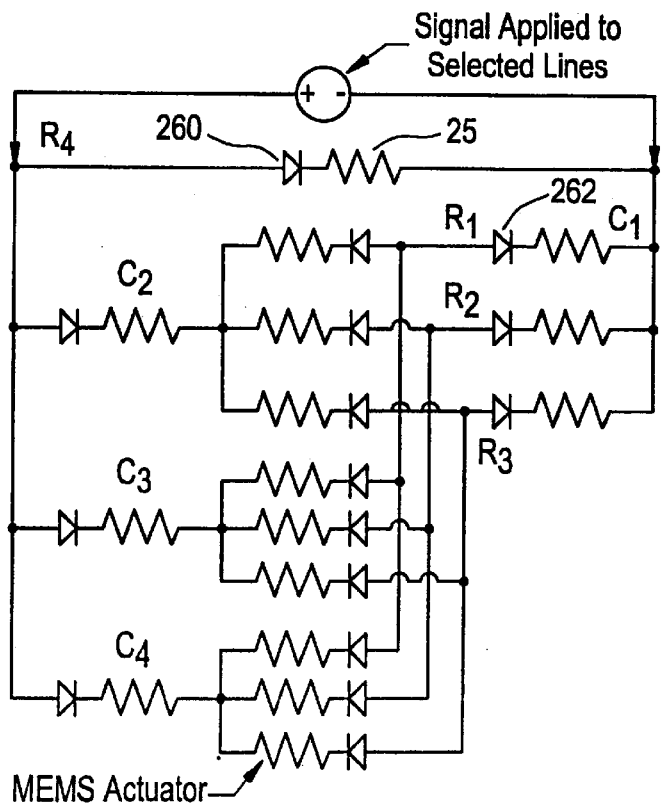
FIG. 14 is an equivalent circuit diagram of the schematic depicted in FIG. 13.

FIG. 14 is an equivalent circuit diagram of the schematic depicted in FIG. 13. As shown, when voltage is applied to row R4 and column C1, all paths going from column terminals C2, C3, or C4, to the row terminals R1, R2, or R3 are blocked by diodes. Since the only remaining current paths are those at the intersection of the activated row and column, all unwanted current paths are eliminated. This is a critical innovation. If diodes 260 are not present, unintended current paths are generated causing unwanted power dissipation in actuators 25 not being addressed. As shown in FIG. 14, there are numerous paths that do not flow through the targeted actuator, for example from row R4, column C1 through row R1, column C2. Diode 262 in FIG. 14, eliminates this unwanted current. The undesirable currents impair performance in two ways. First, they increase the total power required to actuate the device. In a 4×4 array, 56% of the total power is wasted on incidental actuators. This assumes that the resistance value for each actuator is the same. In a 32×32 array, 94% of the power is wasted on incidental actuators. Second, the unwanted currents may partially actuate a mirror resulting in optical insertion loss and cross-talk. Thus, the inclusion of diodes 260 eliminate these problems.

Diodes 260 may be of any suitable type, but there is shown by way of example diodes fabricated by a thin film deposition technique. Diodes 260 can also be fabricated using ion implantation or thermal diffusion. Diodes 260 can also be fabricated on an external substrate much like the fourth embodiment depicted in FIGS. 11 and 12.

Figure 15:
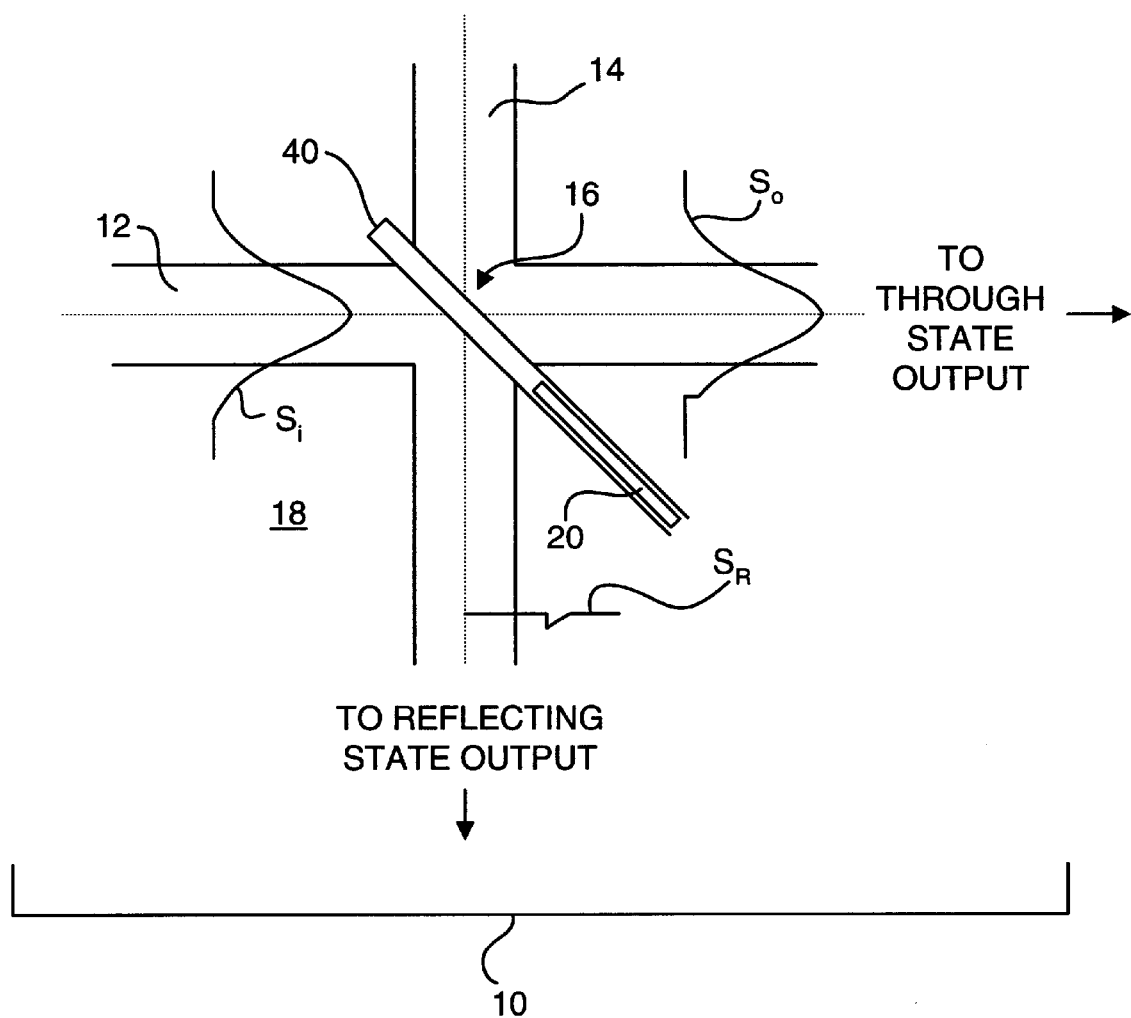
FIG. 15 is a schematic illustrating clipping at a cross-point.

FIG. 15 is a schematic illustration of clipping in switch 10. In order to limit the actuation time of mirror 20, mirror 20 is disposed close to cross-point 16. Input light signal $S_i$ propagates along waveguide core 12 into cross-point 16. However, the modal field distribution of light signal $S_i$ propagating through cross-point 16 extends beyond the core region 12 everywhere along the guide. Mirror 20 is retracted from cross-point 16 and thus, the switch is nominally in the through state. Because of the proximity of mirror 20 to cross-point 16, a portion of light signal $S_i$ is inadvertently reflected by mirror 20. A clipped output signal $S_o$ is directed into the through state output. This clipping represents a loss of signal energy. The unwanted reflected signal $S_R$ that is directed into the reflecting state output 14 represents unwanted cross-talk.

Figure 16:
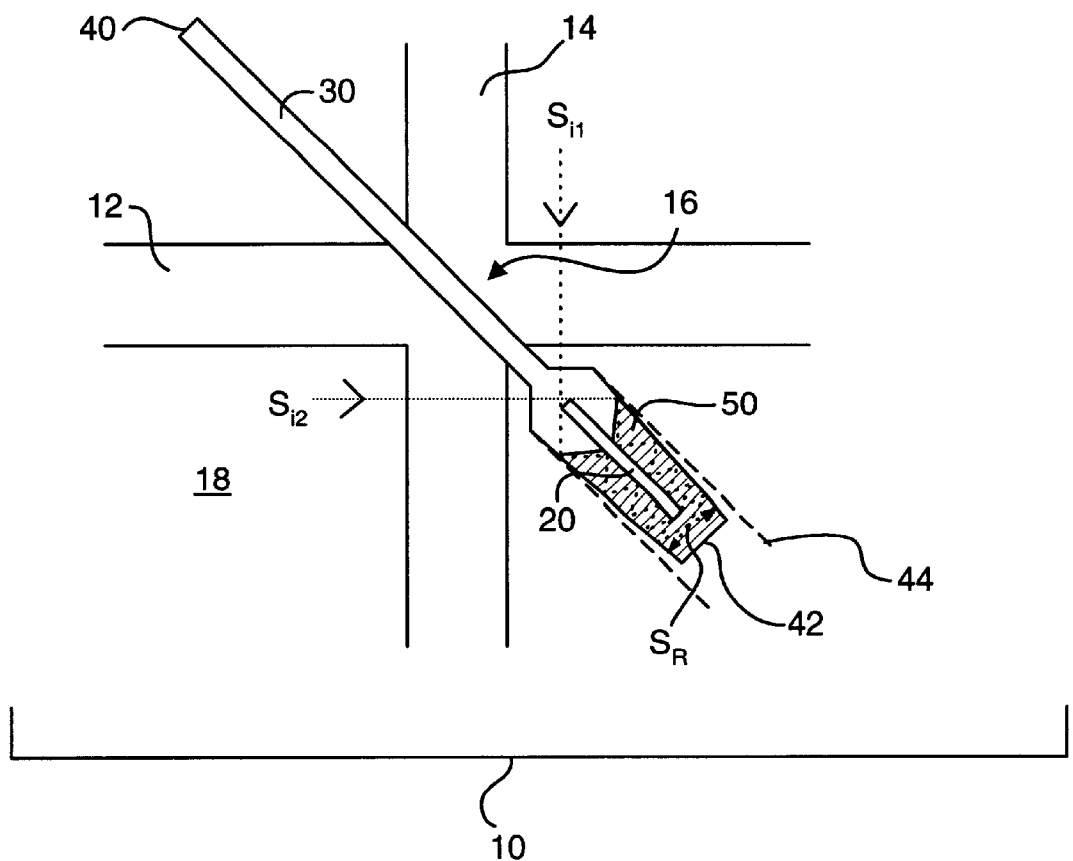
FIG. 16 is a schematic of the sixth embodiment of the present invention using a coated to trench to mitigate the effects of clipping.

As embodied herein and depicted in FIG. 16, a schematic of the sixth embodiment of the present invention using a coated trench to mitigate the effects of clipping is disclosed. FIG. 16 depicts a portion of switch 10. Switch 10 includes input waveguide 12 and output waveguide 14 forming cross-point 16. Waveguides 12 and 14 are disposed in cladding 18. One of ordinary skill in the art will recognize that switch 10 is fabricated with a plurality of cross-points 16. Trench 40 is formed at cross-point 16 and filled with collimation-maintaining fluid 30, as discussed above with respect to earlier embodiments. Trench 40 is paddle shaped as shown in FIG. 16. Mirror 20 is disposed in the wide portion 42 of paddle shaped trench 40 when in a retracted position. A light blocking material 50 is disposed on the side-walls of the wide portion 42 of trench 40. As shown in FIG. 16, material 50 is disposed on the side-walls at the point where mirror 20 is projected onto the side-walls along lines $S_{i1}$ and $S_{i2}$. Lines $S_{i1}$ and $S_{i2}$ are parallel to waveguides 12 and 14, respectively. Material 50 may be of any suitable type, but there is shown by way of example, a reflective material. One of ordinary skill in the art will recognize that the reflective material may be of any suitable type such as gold, aluminum, chrome, or the like. One of ordinary skill in the art will also recognize that a light absorbing material may also be used. Wide-portion 42 is shown in FIG. 16 as being canted away from waveguides 12 and 14 to more effectively direct light energy from the same. However, wide portion 44 without canted side-walls (shown in dashed lines) may also be employed.

As MEMS switch arrays become larger, they become increasingly sensitive to loss. There are three factors that contribute to the loss. The first factor is the diffraction loss due to beam divergence in the trenches. In order to travel from one input to a desired output in an N×N switch, the beam must traverse 2N−1 trenches. In a free-space design that does not utilize collimation-maintaining fluid, the expansion of the beam as it traverses each trench leads to some coupling loss as it enters the next waveguide section. Thus, the total diffraction loss equals (2N−1)×(diffraction loss per trench). Thus, reducing the loss per trench is critical. One method of reducing this loss is by using collimation-maintaining fluid, as discussed above. Second, there is a misalignment loss due to the mirror offset relative to the output waveguide. Finally, there is the propagation loss due to waveguide roughness. This loss is inversely proportional to the waveguide width. One method of reducing these losses is by using adiabatic tapers before and after each trench.

Figure 17:
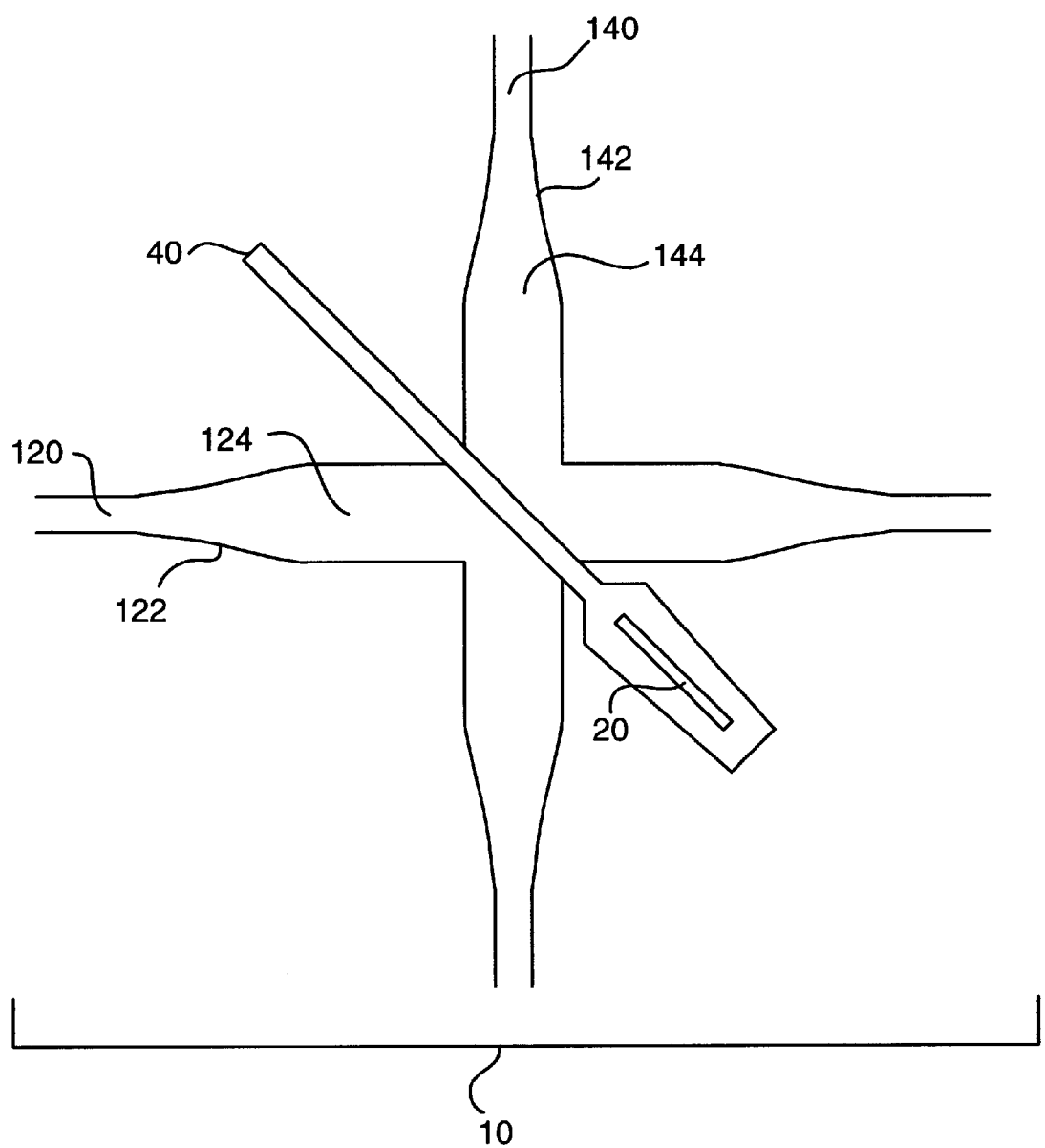
FIG. 17 is a schematic of a MEMS switch having waveguides that include an adiabatic taper in the cross-point region.

As embodied herein and depicted in FIG. 17, a schematic of a portion of MEMS switch 10 having waveguides that include adiabatic tapers in the cross-point region is disclosed. Input waveguide 120 includes adiabatic taper portion 122 and a wide waveguide portion 124 that is adjacent trench 40. Output waveguide 140 includes adiabatic taper portion 142 and a wide waveguide portion 144 that is also adjacent trench 40. Mirror 20 is depicted in the retracted position. By using tapered portions 122 and 142, the beam size increases before traversing the trench and the beam divergence is thereby reduced. There are less changes to the shape of the beam, as well. Furthermore, because the beam is larger, mirror position tolerances become less critical. In effect, adiabatic tapers 122 and 142 perform the same function as do collimating lenses in classical micro-optics assemblies. In one embodiment, standard waveguide portions 120 and 140 have a width of approximately 8 μm. Waveguide portions 124 and 144 have a width of approximately 20 μm. The width of trench 40 in cross-point 16 is approximately 8 μm. In this example, the per trench loss is reduced to 0.02 dB.

Figure 18:
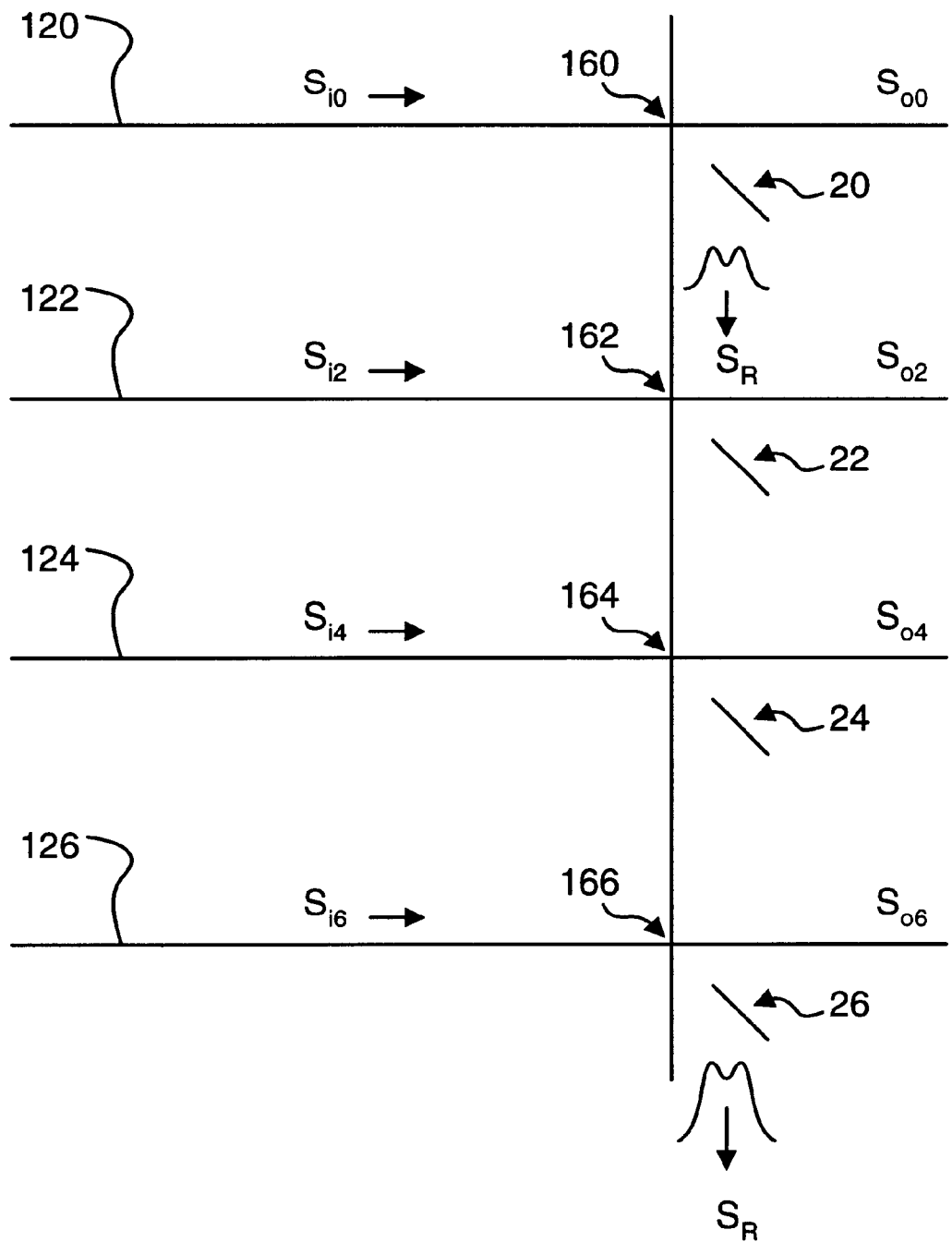
FIG. 18 is a schematic showing the effects of cross-talk caused by clipping in the switch depicted in FIG. 17.

The wide waveguide portions 124 and 144 support more than a single mode. In fact, higher-order, less confined modes can be generated after unguided propagation at each intersection. FIG. 18 is a schematic showing the effects of cross-talk caused by the generation of multi-mode signals in the switch depicted in FIG. 17. In FIG. 18 input waveguides 120–126 intersect output waveguide 140 at cross-points 160–166. Each cross-point 160–166 is configured like the switch 10 depicted in FIG. 17. Input signals $S_{i0}$–$S_{i6}$ propagate along waveguides 120–126, respectively. As shown, at each cross-point 160–166, the widely extended modes of $S_{i0}$–$S_{i6}$ are clipped by mirrors 20–26, respectively. At each cross-point 160–166 a reflected signal $S_R$ is generated. At cross-point 166 the cross-talk accumulates and an output cross-talk $S_{RO}$ is generated.

Figure 19:
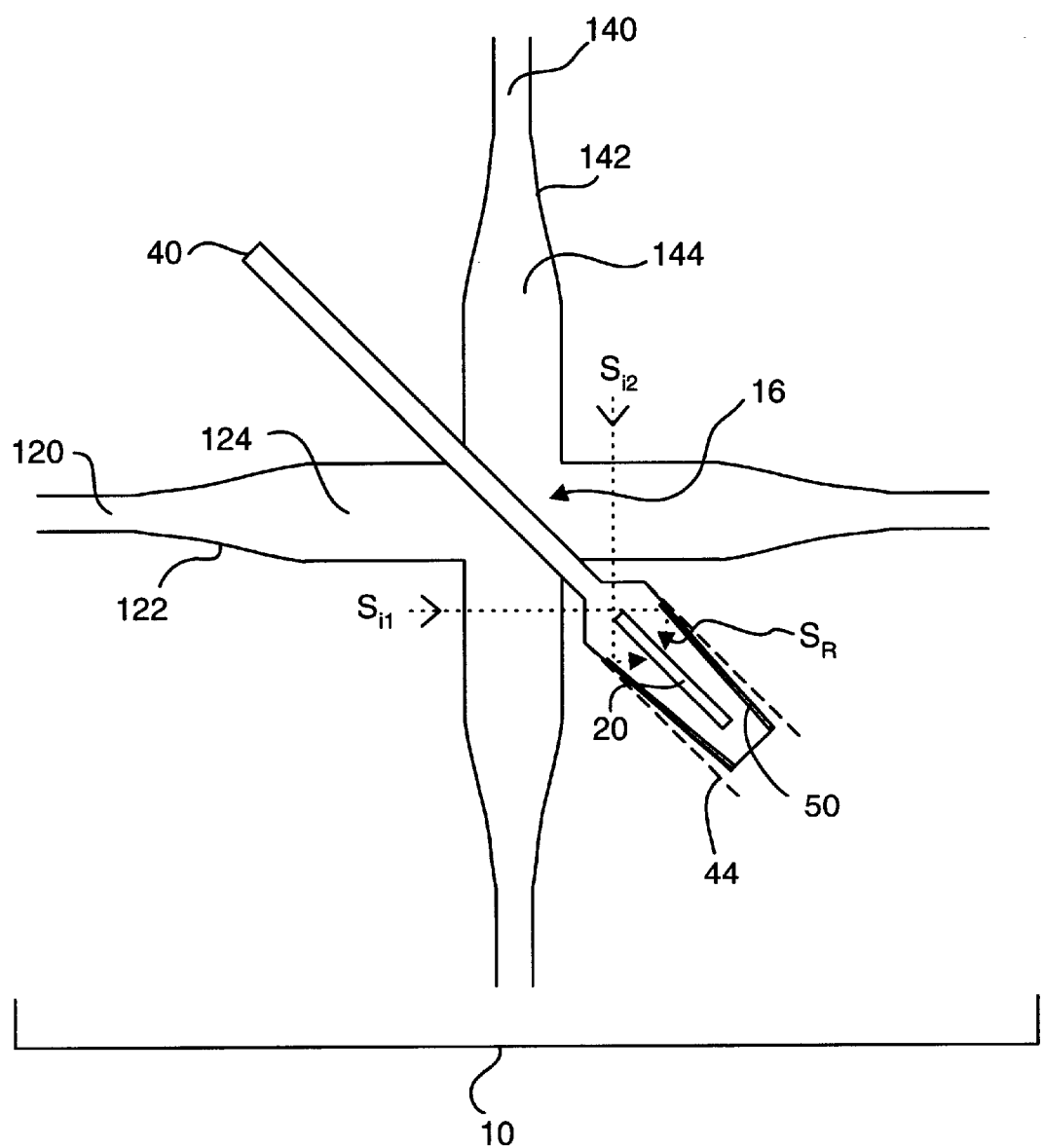
FIG. 19 is a schematic of the seventh embodiment of the invention.

As embodied herein and depicted in FIG. 19, a schematic of the seventh embodiment of the invention is disclosed. Input waveguide 120 includes adiabatic taper portion 122 and a wide waveguide portion 124 that is adjacent trench 40. Output waveguide 140 includes adiabatic taper portion 142 and a wide waveguide portion 144 that is also adjacent trench 40. Mirror 20 is depicted in the retracted position. Again, one of ordinary skill in the art will recognize that switch 10 is fabricated with a plurality of like cross-points 16. Trench 40 is formed at cross-point 16 and filled with collimation-maintaining fluid 30. Again, trench 40 is paddle shaped as disclosed above with respect to FIG. 16. Mirror 20 is disposed in the wide portion 42 of paddle shaped trench 40 when in the retracted position. A light blocking material 50 is disposed from positions where a leading edge of the mirror in directions parallel to the waveguide axes project onto the trench side walls 42. Thus, as shown in FIG. 19, material 50 is disposed on the side-walls at the point where mirror 20 is projected onto the side-walls along lines $S_{i1}$ and $S_{i2}$. Lines $S_{i1}$ and $S_{i2}$ are parallel to waveguides 120 and 140, respectively. Material 50 may be of any suitable type, but there is shown by way of example, a reflective material. One of ordinary skill in the art will recognize that the reflective material may be of any suitable type such as gold, aluminum, chrome, or the like. One of ordinary skill in the art will also recognize that a light absorbing material may also be used. Wide-portion 42 is shown in FIG. 19 as being canted away from waveguides 120 and 140 to more effectively direct light energy away from guides 120 and 140. However, wide portion 44 without canted side-walls (shown in dashed lines) may also be employed.

Figure 20:
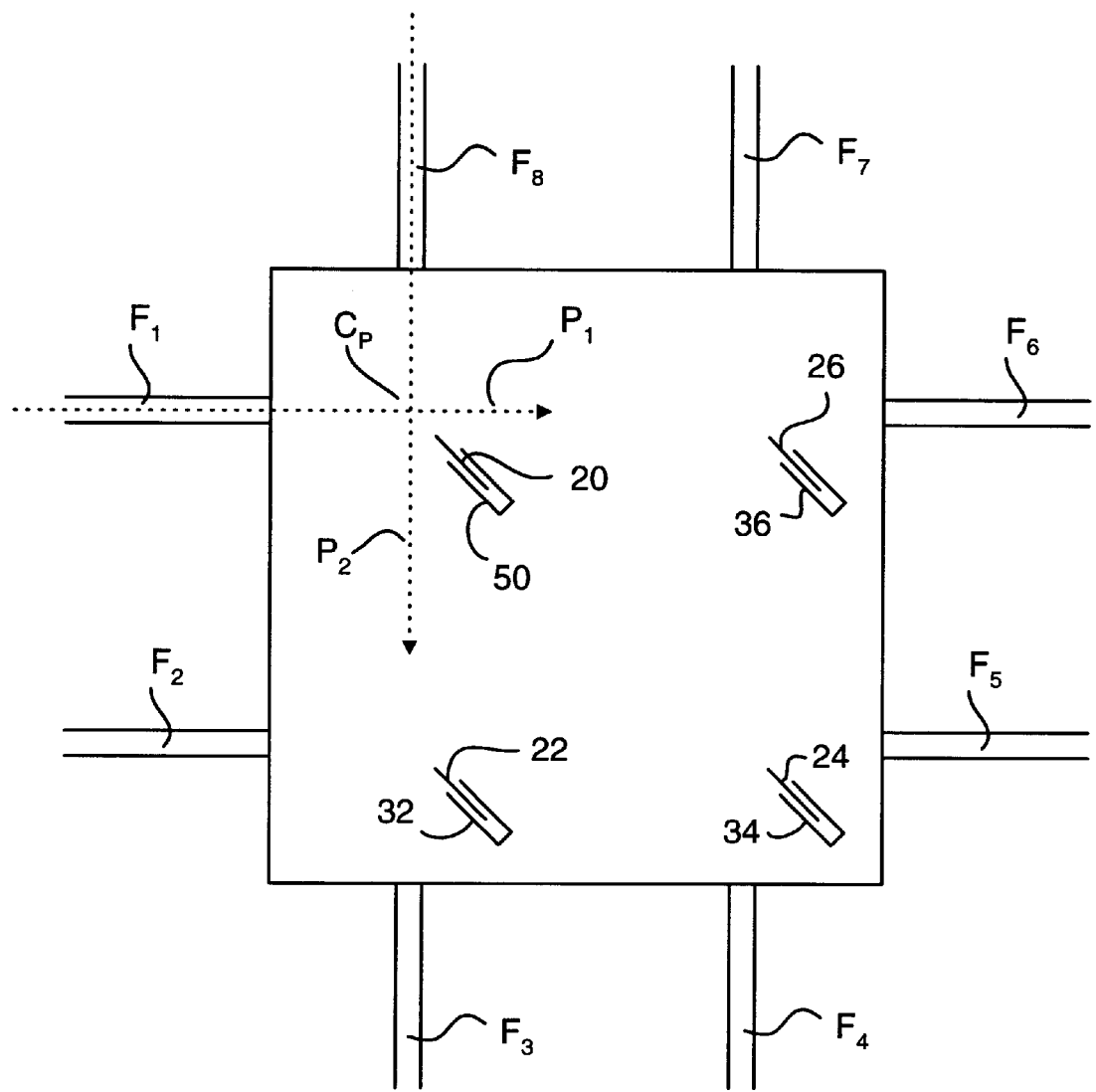
FIG. 20 is a schematic of the eight embodiment of the present invention.

As embodied herein and depicted in FIG. 20, a schematic of the eighth embodiment of the present invention is disclosed. Switch 10 is a free-space device that includes optical fibers F1–F8 mounted to substrate. Each fiber F1–F8 includes collimating micro-optics. A light signal directed from F1 will propagate along propagation path P1 to fiber F6, or be reflected by mirror 20 along propagation path P2 into Fiber F3. As discussed above in relation to the guided wave MEMS switch, when mirror 20 is retracted from cross-point Cp, the switch is nominally in the through state. However, because of the proximity of mirror 20 to cross-point Cp, a portion of light signal propagating along P1 is inadvertently reflected by mirror 20 toward F3 and a clipped output signal is directed towards F6. As in the guided-wave approach, the clipping represents a loss of signal energy. The unwanted reflected signal represents unwanted cross-talk. In the free space approach, a baffle-member 50 is formed on substrate. Baffle-member 50 may be formed of any suitable material using standard photolithographic techniques. For example, silicon, silica, fused silica, ceramic materials, metallic materials, or polymeric materials can be used in forming the baffle-member. Subsequently, baffle-member 50 is coated with a reflective material. One of ordinary skill in the art will recognize that the reflective material may be of any suitable type such as gold, aluminum, chrome, or the like. One of ordinary skill in the art will also recognize that a light absorbing material may also be used.

While specific embodiments of the invention have been shown and described in detail, it will be understood that the invention may be modified without departing from the spirit of the inventive principles as set forth in the hereinafter claims. Thus, it is intended that the present invention cover the modifications and variations of this invention provided they come within the scope of the appended claims and their equivalents.

What is claimed is:

1. An optical device for directing a light signal, said optical device comprising:
   a first light propagation path;
   a second light propagation path intersecting said first light propagation path to form a cross-point;
   a micromirror movable between a through-state outside of said cross-point and a reflecting-state in said cross-point; and
   a baffle-member positioned adjacent said micromirror to inhibit spurious reflections in said through-state.

2. The optical device of claim 1, wherein the first light propagation path and the second light propagation path are comprised of waveguides, and the cross-point includes a trench to allow the micromirror to move between the through-state and the reflecting state.

3. The optical device of claim 2, wherein the baffle-member comprises a coating disposed on a side-wall of the trench.

4. The optical device of claim 3, wherein the coating comprises a light reflecting material.

5. The optical device of claim 3, where the coating comprises a light absorbing material.

6. The optical device of claim 1, wherein the first light propagation path and the second light propagation path are optical fibers, and the cross-point includes a gap to allow the micromirror to move between the through-state and the reflecting state.

7. The optical device of claim 6, wherein the micromirror is formed on a MEMS substrate.

8. The optical device of claim 7, wherein the baffle-member comprises a partition formed on the MEMS substrate.

9. The optical device of claim 8, wherein the partition is coated with a light reflecting material.

10. The optical device of claim 8, wherein the partition is coated with a light absorbing material.

11. The optical device of claim 1, wherein the first light propagation path and the second light propagation path are in free-space.

12. An optical device for directing a light signal, said optical device comprising:
    a first waveguide;
    a second waveguide intersecting said first waveguide to form a cross-point;

a trench intersecting said cross-point;

a micromirror disposed in said trench and movable between a through-state outside of said cross-point and a reflecting-state at said cross-point; and a blocking material disposed on a portion of a sidewall of said trench to inhibit spurious reflections in said through-state.

13. The optical device of claim 12, wherein the blocking material comprises a light reflecting material.

14. The optical device of claim 13, wherein the light reflecting material is comprised of gold.

15. The optical device of claim 13, wherein the light reflecting material is comprised of aluminum.

16. The optical device of claim 13, wherein the light reflecting material is comprised of chrome.

17. The optical device of claim 13, wherein the light reflecting material is comprised of titanium.

18. The optical device of claim 12, wherein the trench further comprises:

a narrow trench portion disposed at the cross-point to accommodate the micromirror in the reflecting-state; and a wide trench portion disposed outside of the cross-point to accommodate the micromirror in the through-state, wherein the blocking material is disposed on a portion of said wide trench portion side wall.

19. The optical device of claim 18, wherein the blocking material is disposed from a position where a leading edge of the mirror in a direction parallel to the waveguide axis projects onto the wide trench portion side wall, to a position on the wide trench portion side wall farthest from the cross-point.

20. The optical device of claim 12, wherein the trench is filled with collimation-maintaining fluid in both the through-state and the reflecting state.

21. The optical device of claim 12, wherein the first waveguide and the second waveguide include adiabatic tapered regions adjacent to the cross-point such that cross-sectional areas of the first waveguide and the second waveguide are increased.

22. The optical device of claim 21, wherein the trench further comprises:

a narrow trench portion disposed at the cross-point to accommodate the micromirror in the reflecting-state; and a wide trench portion disposed outside of the cross-point to accommodate the micromirror in the through-state, wherein the blocking material is disposed on a portion of said wide trench portion side wall.

23. The optical device of claim 22, wherein the blocking material is disposed in the end of the wide trench portion away from the narrow trench portion beginning at positions where an edge of the mirror nearest the narrow trench portion, when the mirror is fully retracted into the wide trench portion, projects, in directions parallel to the waveguide axes and away from the narrow trench portion, onto the trench side walls.

* * * * *